United States Patent
Yamanishi et al.

(10) Patent No.: US 12,137,707 B2
(45) Date of Patent: Nov. 12, 2024

(54) PET FOOD

(71) Applicant: Unicharm Corporation, Ehime (JP)

(72) Inventors: Hiroto Yamanishi, Itami (JP); Yoko Kanehiro, Itami (JP); Junpei Yamaguchi, Itami (JP)

(73) Assignee: UNICHARM CORPORATION, Ehime (JP)

( * ) Notice: Subject to any disclaimer, the term of this patent is extended or adjusted under 35 U.S.C. 154(b) by 679 days.

(21) Appl. No.: 17/287,318

(22) PCT Filed: Oct. 25, 2019

(86) PCT No.: PCT/JP2019/041987
§ 371 (c)(1),
(2) Date: Apr. 21, 2021

(87) PCT Pub. No.: WO2020/095726
PCT Pub. Date: May 14, 2020

(65) Prior Publication Data
US 2021/0352936 A1    Nov. 18, 2021

Related U.S. Application Data

(60) Provisional application No. 62/756,096, filed on Nov. 6, 2018.

(30) Foreign Application Priority Data

Mar. 18, 2019  (JP) ................. 2019-050120

(51) Int. Cl.
*A23K 20/147*  (2016.01)
*A23K 10/30*   (2016.01)
*A23K 50/40*   (2016.01)

(52) U.S. Cl.
CPC ............ *A23K 20/147* (2016.05); *A23K 10/30* (2016.05); *A23K 50/40* (2016.05)

(58) Field of Classification Search
CPC ............ A23V 2250/5488; A23K 50/42; A23K 40/25; A23K 10/00; A23K 20/147; A23K 50/40; A23K 10/30; A01K 15/026; A23L 1/16
See application file for complete search history.

(56) References Cited

U.S. PATENT DOCUMENTS

| | | |
|---|---|---|
| 3,883,672 A | 5/1975 | Bone et al. |
| 4,006,266 A | 2/1977 | Bone et al. |
| 4,273,788 A | 6/1981 | Bone et al. |
| 2005/0271709 A1 | 12/2005 | Dazliel et al. |
| 2006/0188632 A1 | 8/2006 | Nie et al. |
| 2006/0263416 A1 | 11/2006 | Brent |
| 2013/0273206 A1 | 10/2013 | Moulton |
| 2015/0335044 A1* | 11/2015 | Kanehiro ............ A23K 50/42 426/302 |
| 2016/0338382 A1 | 11/2016 | Ikeda et al. |

FOREIGN PATENT DOCUMENTS

| | | |
|---|---|---|
| CN | 1688342 A | 10/2005 |
| CN | 103607906 A | 2/2014 |
| CN | 105076737 A | 11/2015 |
| CN | 105188355 A | 12/2015 |
| CN | 106455635 A | 2/2017 |
| CN | 106659192 A | 5/2017 |
| CN | 106659195 A | 5/2017 |
| CN | 106922119 A | 7/2017 |
| CN | 107613783 A | 1/2018 |
| JP | 2008539788 A | 11/2008 |
| JP | 2010029162 A | 2/2010 |
| JP | 2010063374 A | 3/2010 |
| JP | 2013544487 A | 12/2013 |
| WO | 2014007251 A1 | 1/2014 |
| WO | 2014098179 A1 | 6/2014 |
| WO | 20140998179 A1 | 6/2014 |
| WO | 2015072156 A1 | 5/2015 |
| WO | 2017022280 A1 | 5/2015 |

OTHER PUBLICATIONS

Extended European Search Report for European Application No. EP 19881056.6, mailed Oct. 28, 2021, 9 pgs.
International Search Report dated Dec. 17, 2019 with English Translation for Intl. App. No. PCT/JP2019/041987, 4 pgs.
International Search Report dated Dec. 3, 2019 with English Translation for Intl. App. No. PCT/JP2019/041993, 4 pgs.
Office Action issued in corresponding Chinese application 201980069240.8, mailed on Nov. 1, 2023, with English translation, 10 pgs.
Translation of Chinese Office Action for Application No. CN 201980071032.1 mailed on Aug. 29, 2023.

* cited by examiner

*Primary Examiner* — Hong T Yoo
(74) *Attorney, Agent, or Firm* — Fredrikson & Byron, P.A.

(57) ABSTRACT

A pet food is provided, the pet food including soy protein grains containing soy protein, in which the soy protein grains include a first soy protein grain and a second soy protein grain, a main raw material of the first soy protein grain is the same as a main raw material of the second soy protein grain, a hardness of the first soy protein grain is within a range of 1 to 15 N, and a hardness of the second soy protein grain is within a range of 30 to 100 N.

4 Claims, No Drawings

PET FOOD

RELATED APPLICATIONS

This application is a 35 U.S.C. 371 national phase filing from International Application No. PCT/JP2019/041987, filed Oct. 25, 2019, which claims priority to Japanese Application No. 2019-050120, filed Mar. 18, 2019, and U.S. Provisional Patent Application No. 62/756,096, filed Nov. 6, 2018, the contents of which are incorporated herein by reference.

BACKGROUND

In manufacturing of pet foods, it is common practice to manufacture meat substitutes that resemble the appearance of high quality meats from low-cost, protein-rich raw materials. For example, Patent Literature 1 discloses a method of obtaining a pet food having a real meat-like appearance using soy protein.

CITATION LIST

Patent Literature

Patent Literature 1: Japanese Patent Application Laid-Open No. 2013-544487

SUMMARY

Technical Problem

However, because conventional meat substitutes can impart only a certain texture, palatability was insufficient in some cases. In addition, pets (for example, dogs) prefer to eat soft grains, but feeding only soft grains may weaken their jaws. Accordingly, it has been desired that a plurality of grains have different textures among the grains even in a case where the grains are made of the same main raw materials.

The present invention has been made in view of the above circumstances, and an object of the present invention is to provide a pet food containing grains having a meat-like appearance and having different textures even in a case where main raw materials thereof are the same as each other.

Solution to Problem

The present invention includes the follow aspects.

(1) A pet food including soy protein grains containing soy protein, in which the soy protein grains include a first soy protein grain and a second soy protein grain, a main raw material of the first soy protein grain is the same as a main raw material of the second soy protein grain, a hardness of the first soy protein grain is within a range of 1 to 15 N, and a hardness of the second soy protein grain is within a range of 30 to 100 N.

(2) The pet food according to (1), in which the soy protein grain contains a liquid raw material, and a content of the liquid raw material is 25 parts by mass or more with respect to 100 parts by mass of the soy protein grains.

(3) The pet food according to (1) or (2), in which a content of the first soy protein grain is 1% to 40% by mass with respect to a total amount of the pet food, and a content of the second protein grain is 1% to 40% by mass with respect to the total amount of the pet food.

(4) The pet food according to any one of (1) to (3), in which a size of the soy protein grain is 3 to 30 mm.

(5) The pet food according to any one of (1) to (4), in which a mass ratio of the first soy protein grain to the second soy protein grain is 1/3 to 3/1.

Advantageous Effect of the Invention

According to the present invention, it is possible to provide a pet food containing grains having a meat-like appearance and having different textures even in a case where main raw materials thereof are the same as each other.

DESCRIPTION OF EMBODIMENTS

In the present specification, the term "pet" refers to an animal raised by a person. In a narrower sense, pets are animals that are kept and loved by their owners. In addition, the term "pet food" refers to feed for pets. A pet food according to the present invention can be sold as an "animal feed" or "animal food."

In the present specification, "palatability" is an index of whether or not a pet food is preferred and eaten by a pet, and is caused by mouthfeel, taste, odor, and the like. In the present specification, a case in which "coating" of a powder is performed means that the powder is applied to surfaces of grains to be dredged to the surfaces of the grains. In the present specification, a case in which "coating" of a liquid is performed means that the liquid is applied to surfaces of grains to be dredged to the surfaces of the grains, and the case also includes a case in which the grains are impregnated with some or whole of the applied liquid. For example, a case in which "coating" of oils and fats is performed means that the oils and fats are applied to surfaces of grains to be dredged to the grains, and the case also includes a case in which the grains are impregnated (soaked) with some or whole of the applied oils and fats.

[Method of Measuring Moisture Content]

In the present specification, a value of a moisture content is a value obtained by an atmospheric heating and drying method. In the atmospheric heating and drying method, a subject to be measured is pulverized in a pulverizer by passing the subject through a 1 mm sieve. Then the pulverized subject is used as an analysis sample, and 2 to 5 g of the analysis sample is accurately weighed and placed in an aluminum weighing dish. After the analysis sample is dried at 135° C. for 2 hours and cooled in a desiccator, a weight of the analysis sample is accurately weighed again, so that moisture content is obtained from the weight difference in the analytical, sample before and after drying. More specifically, the subject to be measured is pulverized by a pulverizer such that the subject passes through a 1 mm sieve, and this pulverized product is used as an analysis sample. A mass (W1 gram) of an aluminum weighing can is measured in advance as a constant value. The analysis sample is placed in this aluminum weighing can, and a mass (W2 gram) is weighed. The analysis sample is then dried at 135° C. for 2 hours using a forced circulation type hot air dryer. After allowing the analysis sample to cool in a dry atmosphere (in a silica gel desiccator), a mass (W3 gram) is weighed. From each mass obtained, a moisture content of the analysis sample is obtained using the following formula. Moisture content (unit: mass %) of analysis sample=(W2−W3)/(W2−W1)×100 A moisture content is a value measured immediately after opening a final product within 30 days from a date of manufacture, or a value measured under the same conditions as above.

[Method of Measuring Hardness]

In the present specification, a hardness (breaking hardness) of grains constituting pet food grains is a value obtained by the following measurement method. Using a compression tester (EZ-TEST, model number: EZ-500NSX, manufactured by Shimadzu Corporation), a breaking stress when compressed at a constant compression rate is measured under the following conditions. Plunger:

Cylindrical plunger with a diameter of 15 mm and a thickness of 5 mm
Platform: Flat plate
Compression rate: 60 mm/min
Lower point of plunger: 3.5 mm (compression distance)
Measurement temperature: 25° C. Specifically, one grain to be measured is placed on a flat plate, and a stress is measured while pressing a plunger vertically from directly above the grain at a constant speed. A peak value (maximum value) of stress is read as a value of breaking stress. A numerical unit of breaking hardness can be converted to Newton (N) by multiplying a numerical value of breaking stress (unit: kgw) measured by the compression tester by 9.8.

<Pet Food>

A pet food according to the present embodiment contains soy protein grains containing soy protein. In the pet food, according to the present embodiment, the soy protein grains include a first soy protein grain and a second soy protein grain. A main raw material of the first soy protein grain is the same as a main raw material of the second soy protein grain. A hardness of the first soy protein grain is within a range of 1 to 15 N, and a hardness of the second soy protein grain is within a range of 30 to 100 N. A hardness of the first soy protein grain is more preferably within a range of 4 to 10 N, and a hardness of the second soy protein grain is more preferably within a range of 50 to 100 N. In the present embodiment, the term "main raw material" means a raw material that accounts for 50% by mass or more of all raw materials constituting the grains. In the present embodiment, a composition of the first soy protein grain and a composition of the second soy protein grain are preferably the same compositions. In a case where a hardness of the first soy protein grain and a hardness of the second soy protein grain are within the above ranges, it is possible to provide a pet food containing grains having different textures even in a case where main raw materials thereof are the same as each other. Accordingly, in the pet food according to the present embodiment, it is possible to enhance palatability for pets while still exhibiting a meat-like appearance. Furthermore, in the pet food according to the present embodiment, since a main raw material of the first soy protein grain is the same as a main raw material of the second soy protein grain, these soy protein grains have the same appearance. Accordingly, it is possible to prevent a pet from selecting and eating only soft, grains in the pet food, and to make it easier for a feeder person to feed a pet in consideration of a nutritional balance.

A moisture content of the first soy protein grain is preferably 15% to 30% by mass, and is more preferably 20% to 30% by mass. A moisture content of the second soy protein preferably 5% to 20% by mass, and is more preferably 10% to 20% by mass.

In the pet food according to the present embodiment, a content of the first soy protein grain is preferably 1% to 40% by mass with respect to a total amount of the pet food, and a content of the second soy protein grain is preferably 1% to 40% by mass with respect to the total amount of the pet food. A content of each of the first soy protein grain and the second soy protein grain is more preferably 5% to 15% by mass. In a case where a content of the first soy protein grain and a content of the second soy protein grain are within the above-mentioned preferred ranges, it becomes easier to obtain a pet food containing grains having different textures even in a case where main raw materials thereof are the same as each other while further enhancing palatability.

Regarding a size of the soy protein grains according to the present embodiment, a shortest diameter and a longest diameter are preferably 3 to 30 mm, respectively, are more preferably 6 to 16.5 mm, respectively, and are even more preferably 7 to 12 mm, respectively. A size of the soy protein grains is a grain size that is easy for pets to eat on a daily basis, and therefore it becomes easy to further enhance palatability. In addition, a size thereof is a size large enough to impart a chewy texture, and therefore it becomes easy to strengthen jaws.

In the pet food according to the present embodiment, a mass ratio of the first soy protein grain to the second soy protein grain is preferably 1/3 to 3/1, is more preferably 1/2 to 2/1, and is even more preferably 1/1.5 to 1.5/1. With this configuration, it becomes easy to obtain a pet food containing grains having different textures even in a case where main raw materials thereof are the same as each other while further enhancing palatability.

Hereinafter, each of the components contained in the pet food according to the present embodiment will be described in detail.

<Soy Protein Grain>

Soy protein grains are grains containing a raw material containing at least soy protein. Examples of raw materials containing soy protein include soybean, isolated soy protein, fermented soybean meal, defatted soybean, concentrated soy protein, and the like. In the present embodiment, it is preferable, to use defatted soybean as the raw material containing soy protein. A soy protein grain preferably contains 50% by mass or more of the raw material containing soy protein, more preferably contains 75% by mass or more thereof, and even more preferably contains 100% by mass thereof. Examples of raw materials other than the raw material containing soy protein in soy protein grains include cereals such as wheat flour, wheat gluten, corn, and corn gluten meal; animal protein raw materials such as chicken meal, meat meal, and fish meal; and oils and fats such as beef fat, palm oil, and soybean oil.

<Liquid Raw Material>

In the present embodiment, the soy protein grain may contain a liquid raw material. Specific examples of liquid raw materials (including semi-solid raw materials) include water, oils and fats (animal oils and fats such as chicken oil (chicken oil), pork fat (lard), beef fat (tallow), milk fat, and fish oil; and vegetable oils and fats such as olive oil, cacao oil, palm oil, palm kernel oil, coconut oil, palm oil, and can oil), liquid palatability enhancers, liquid sugars, moisturizers, preservatives, emulsifiers, flavorants, colorants, and the like. The liquid raw material according to the present embodiment preferably contains sugar alcohols, glycerin, saccharides, and the like. When saccharides such as sugar alcohols and carbohydrates are used as the liquid raw material, soy protein grains become sweet, and thereby palatability for pets can be increased, and an interest of pets for a pet food becomes stronger. Meanwhile, because sugar alcohols and glycerin have a moisturizing effect, use of them as a liquid raw material makes it easy to maintain a moisture content of a pet food within a desired range. Among them, as the liquid raw material, a mixture containing at least water and a moisturizer is preferable, and a mixture containing at least 10% to 30% of water and 70% to 90% of a moisturizer is inure preferable.

In the present embodiment, the soy protein grains contain a liquid raw material, and with respect to 100 parts by mass of the soy protein grains, a content of the liquid raw material is preferably 25 parts by mass or more, is more preferably 30 parts by mass or inure, and is even more preferably 35 parts by mass or more. In a case where a content of the liquid raw material is within the above-mentioned preferred ranges, it becomes easier to obtain a pet food containing grains having different textures even in a case where main raw materials thereof are the same as each other while further enhancing palatability.

<Additives>

In the present embodiment, the soy protein grains may contain additives such as vitamins, minerals, amino acids, flavor ingredients, fibers, colorants, and powdery palatability enhancers, and the like. A powdery palatability enhancer is preferable as an additive from the viewpoint of enhancing palatability. More specific examples of powdery palatability enhancers include animal raw material extracts, plant raw material extracts, yeast extracts, dried products of yeast, and the like.

<Other Grains> The pet food according to the present embodiment may contain grains other than soy protein grains (hereinafter, may be referred to as "food grain"). Grains conventionally known as a comprehensive nutritional pet food can be used as food grains. In a case where the pet food according to the present embodiment contains the food grains, a mass ratio of soy protein grains to the food grains is preferably 1/99 to 99/1, is more preferably 2/98 to 70/30, and is even more preferably 3/97 to 60/40. When a mass ratio of soy protein grains to the food grains is within the above-mentioned preferable range, it is easy to enhance palatability of a pet food.

The food grains are obtained by, for example, heating and molding a raw material mixture in which a powder raw material and a liquid raw material are mixed. A base material may be swollen grains or non-swollen grains, but swollen grains are preferable from the viewpoint of texture. The "swollen grains" are grains obtained by molding a raw material mixture into a grain shape, and are grains obtained through a swelling process of foaming inside the raw material mixture. The "swelling process" refers to a process of generating a gas inside a raw material mixture by a method such as heating, pressurization, fermentation, chemical reaction, or depressurization. In the swelling process, a volume of the raw material mixture increases due to generation of gas, resulting in porous properties. A bulk density decreases as a volume of the raw material mixture increases. The "swollen grains" are obtained by molding the raw material mixture into a grain shape before the swelling process, after the swelling process, or at the same time as the swelling process. The "non-swollen grains" are grains manufactured without being subjected to the swelling process.

Specific examples of powder raw materials for the food grains include cereals (corn, wheat, wheat flour, wheat bran, rice, bread crumbs, barley, oat, rye, and the like), potatoes (sweet potatoes, potatoes, and the like), beans (whole soybeans and the like), starches (wheat starch, corn starch, rice starch, potato starch, tapioca starch, sweet potato starch, sago starch, modified starch, and the like), vegetable proteins (corn gluten meal, wheat protein, bean protein, rice protein, potato protein, and the like), meat (meat of domesticated or wild animals such as cows, pigs, sheep, deer, and rabbits; meat of fowl such as chickens, turkeys, quails, and domestic poultry; meal (chicken meal, pork meal, beef meal, mixed meal of these); and the like), fish and seafood (fishes such as tuna, bonito, and horse mackerel; crustaceans such as shrimp and crab; mollusks such as octopus and squid; shellfishes such as scallops and turban shells; fish extracts; Katsuobushi (dried bonito flakes); meal (fish meal); and the like), vegetables, nuts and seeds, mushrooms, eggs, sugars, milk, additives (vitamins, minerals, amino acids, flavor ingredients, powdery palatability enhancers, fibers, colorants, phosphates, pH adjusters, seasonings, antioxidants, trehalose, and the like), and the like. Meal means a powder obtained by compressing and finely crushing meat or fish and seafood. More specific examples of powdery palatability enhancers include animal raw material extracts, plant raw material extracts, yeast extracts, dried products of yeast, and the like. A liquid raw material for the food grains is the same as that in <Liquid raw material> described above.

A shape of the food grains may be any shape suitable for pets to eat, and is not particularly limited. For example, it possible to apply any shape such as spherical, ellipsoidal (go-stone-like), donut-like, pellet-like, cylindrical, polygonal, plate-like, clover-like, heart-like, star-like, and cross-like shapes. Furthermore, regarding a size of the food grains, the food grains may be in a small grain form that a pet can chew with a bite, or may be in a large grain form that a pet can bite multiple times, Regarding a size of the food grains, for example, a shortest diameter and a longest diameter are preferably 3 to 30 mm, respectively, are more preferably 6 to 16.5 mm, respectively, and are even more preferably 7 to 12 mm, respectively.

<Method for Manufacturing Pet Food>

The pet food according to the present embodiment can be manufactured by, for example, a known method to be described later.

[Granulation Process]

A granulation process is a process of granulating a raw material mixture to obtain soy protein grains. Examples of granulation processes include a method in which raw materials are mixed to form a raw material mixture, and the raw material mixture is molded (granulated) into a grain shape. Specific examples of granulation processes include a method for manufacturing soy protein grains (swollen grains) using an extruder. As a method for manufacturing grains using an extruder include, it is possible to apply, for example, a method disclosed in "Small Animal Clinical Nutrition, 5th Edition" (edited by Michael S. Hand, Craig D. Thatcher, Rebecca L. Remillard. Philip Roudebusg, and Bruce J. Novotny; published by Mark Morris Associates; 2014; p. 209 to p. 215).

Art example of the method for manufacturing soy protein grains using an extruder will be described. First, raw materials for soy protein grains are pulverized as necessary and then mixed. The raw materials may be mixed while being pulverized using a grinder or the like. In addition, as necessary, water (which volatilizes during a manufacturing process and is not finally included in a raw material composition) is added, and thereby a raw material mixture is obtained. The obtained raw material mixture is put into an extruder, heated, pressurized, and then extruded front an outlet. The outlet has a plate in which a hole having a predetermined shape is formed, and has a cutter for cutting the raw material mixture extruded from the plate to a predetermined length (thickness). The raw material mixture is extruded from the hole of the plate and cut with the cutter to be formed into a predetermined shape, and at the same time, water vapor in the raw material mixture expands by releasing from a pressurized state to a normal pressure. Thereby, the raw material mixture swells, and porous soybean protein grains are obtained.

[Drying Process]

A drying process is a process of drying the soy protein grains obtained by the above-mentioned granulation process. Examples of methods of drying soy protein grains include known methods such as a method of drying naturally, a method of drying by blowing warm air, a method of drying by decompressing, and a method of drying by freeze-drying. Among these drying methods, the method of drying by blowing warm air is preferable in terms of improving flavor of a pet food.

A temperature of the soy protein grains at the time of drying and a temperature of warm air blown onto the soy protein grains are not particularly limited. For example, a temperature of the warm air is preferably 150° C. or lower. Furthermore, a lower limit value of the temperature of the warm air is not particularly limited. It is usually a temperature higher than room temperature, and is preferably 30° C. or higher. In a case of drying in this temperature range, a time for the heat treatment is preferably 1 minute to 120 minutes. In a case where a temperature and a time are relatively equal to or more than a lower limit value in the above-mentioned temperature range and time range, soy protein gains can be dried in a relatively short time. In a case Where a temperature is equal to or less than an upper limit in the above-mentioned temperature range, it is possible to prevent the soy protein grains from being overheated.

[Liquid Raw Material Coating Process]

A liquid raw material coating process can be carried out by putting soy protein grains into a container, and then putting the liquid raw material into the container to mix them.

[Powder Coating Process]

A powder coating process is a process of coating, with a powdery palatability enhancer, the soy protein grains obtained by the drying process or the soy protein grains having a liquid raw material coating.

Examples of methods of coating the grains with a powdery palatability enhancer include a method of putting the soy protein grains and a powdery palatability enhancer in a container such as a tank, and stirring them with a stirrer, and a method of vibrating the container.

A temperature of the soy protein grains in a case where the powdery palatability enhancer is coated on the soy protein grains is preferably 15° C. to 60° C., is more preferably 20° C. to 50° C., and is even more preferably 30° C. to 40° C. In this case, a temperature of the powdery palatability enhancer is preferably 5° C. to 40° C., is more preferably 10° C. to 35° C., and is even more preferably 15° C. to 30° C. In this case, a temperature of the powdery palatability enhancer is preferably 10° C., to 25° C. In a case where a temperature of the soy protein grains is within the above-mentioned range, a coating amount (powder coating amount) of the powdery palatability enhancer dredging to the soy protein grains tends to increase.

[Food Grain Mixing Process]

In a food grain mixing process, the soy protein grains obtained above, and food grains obtained by a known method are mixed and stored in a packaging container or the like. EXAMPLES Hereinafter, the present invention will be described in more detail reference to examples, but the present invention is not limited to these examples.

(Manufacturing of Pet Food)

Defatted soybean was used as a raw material for soy protein grains. The raw material for soy protein grains was put into an extruder and subjected to a heat treatment at 100° C. to 140° C. for 1 to 5 minutes while kneading to gelatinize a starch component, and then extruded and granulated into a grain shape at an outlet of the extruder and welled at the same time. The obtained grains were dried at 90° C. for 60 minutes using a dryer, and thereby soy protein grains were obtained. A liquid raw material having a liquid raw material composition shown in Table 1 and soy protein grains of each of examples were prepared in a mass ratio of Table 2 so that a total grain weight was 100 g. These were mixed and stirred to obtain a pet food of each of the examples.

(Evaluation of Hardness and Moisture Content of Pet Food)

For each of the pet foods, physical properties and a moisture content of each of the pet foods were measured 5 days after the manufacture. A hardness and a moisture content of grains were measured by the method described above. In Comparative Example 6, a commercially available pet food containing soy protein grains was used.

TABLE 1

| | Blending amount |
|---|---|
| Moisturizer | 77% |
| Water | 23% |
| Total | 100% |

TABLE 2

| | Content of liquid raw material (mass %) | Content of soy protein grain (mass %) | Hardness of grains (N) | | | | Average value of moisture content (mass %) | Number of grains having hardness of 1 to 15 N (number) | Number of grains having hardness of 30 to 100 N (number) | Total number of grains (number) |
|---|---|---|---|---|---|---|---|---|---|---|
| | | | Average hardness (N) | Standard deviation of hardness | Maximum value of hardness (N) | Minimum value of hardness (N) | | | | |
| Comparative Example 1 | 10 | 90 | 38.05 | 12.84 | 68.89 | 16.75 | 8.65 | 0 | 21 | 30 |
| Comparative Example 2 | 20 | 80 | 43.46 | 18.48 | 72.35 | 15.80 | 11.95 | 0 | 8 | 10 |
| Example 1 | 30 | 70 | 33.81 | 21.42 | 95.32 | 4.05 | 14.00 | 9 | 12 | 30 |
| Example 2 | 35 | 65 | 28.56 | 20.10 | 69.70 | 5.21 | 16.45 | 10 | 10 | 30 |
| Comparative Example 3 | 40 | 60 | 11.47 | 5.17 | 21.56 | 4.10 | 17.35 | 8 | 0 | 10 |
| Comparative Example 4 | 50 | 50 | 8.07 | 5.01 | 21.12 | 2.53 | 19.77 | 9 | 0 | 10 |

TABLE 2-continued

|  | Content of liquid raw material (mass %) | Content of soy protein grain (mass %) | Hardness of grains (N) | | | | Average value of moisture content (mass %) | Number of grains having hardness of 1 to 15 N (number) | Number of grains having hardness of 30 to 100 N (number) | Total number of grains (number) |
| --- | --- | --- | --- | --- | --- | --- | --- | --- | --- | --- |
|  |  |  | Average hardness (N) | Standard deviation of hardness | Maximum value of hardness (N) | Minimum value of hardness (N) |  |  |  |  |
| Comparative Example 5 | 60 | 40 | 4.25 | 1.51 | 6.92 | 1.77 | 24.10 | 10 | 0 | 10 |
| Comparative Example 6 | — | — | 11.04 | 3.40 | 18.49 | 2.64 | 8.94 | 27 | 0 | 30 |

As shown in Table 1, in the pet foods of Examples 1 and 2 containing first soy protein grains and second soy protein grains each having the same main raw material, it was confirmed that a hardness of the first soy protein grains was within a range of 1 to 15 N, and a hardness of the second soy protein grains was within a range of 30 to 100 N.

INDUSTRIAL APPLICABILITY

According to the present invention, it is possible to provide a pet food containing grains having a meat-like appearance and having different textures even in a case where main raw materials thereof are the same as each other.

The invention claimed is:

1. A pet food consisting of:
a first soy protein grain and a second soy protein grain,
the first soy protein grain and the second soy protein grain consist of soybean and a liquid raw material,
the liquid raw material is selected from the group consisting of water, sugar alcohols, glycerin, and saccharides,
a content of the liquid raw material is 25 parts by mass or more and 35 parts by mass or less with respect to 100 parts by mass of the first soy protein grains,
a content of the liquid raw material is 25 parts by mass or more and 35 parts by mass or less with respect to 100 parts by mass of the second soy protein grains,
a hardness of the first soy protein grain is within a range of 1 to 15 N, and
a hardness of the second soy protein grain is within a range of 30 to 100 N.

2. The pet food according to claim 1,
wherein a content of the first soy protein grain is 1% to 40% by mass with respect to a total amount of the pet food, and
a content of the second soy protein grain is 1% to 40% by mass with respect to the total amount of the pet food.

3. The pet food according to claim 1, wherein a size of the first soy protein grain is 3 to 30 mm, and
a size of the second soy protein grain is 3 to 30 mm.

4. The pet food according to claim 1, wherein a mass ratio of the first soy protein grain to the second soy protein grain is 1/3 to 3/1.

* * * * *